Dec. 26, 1933.   V. P. WILLIAMS   1,940,779
BALL AND SOCKET UNIVERSAL JOINT
Filed Sept. 22, 1932   3 Sheets-Sheet 1
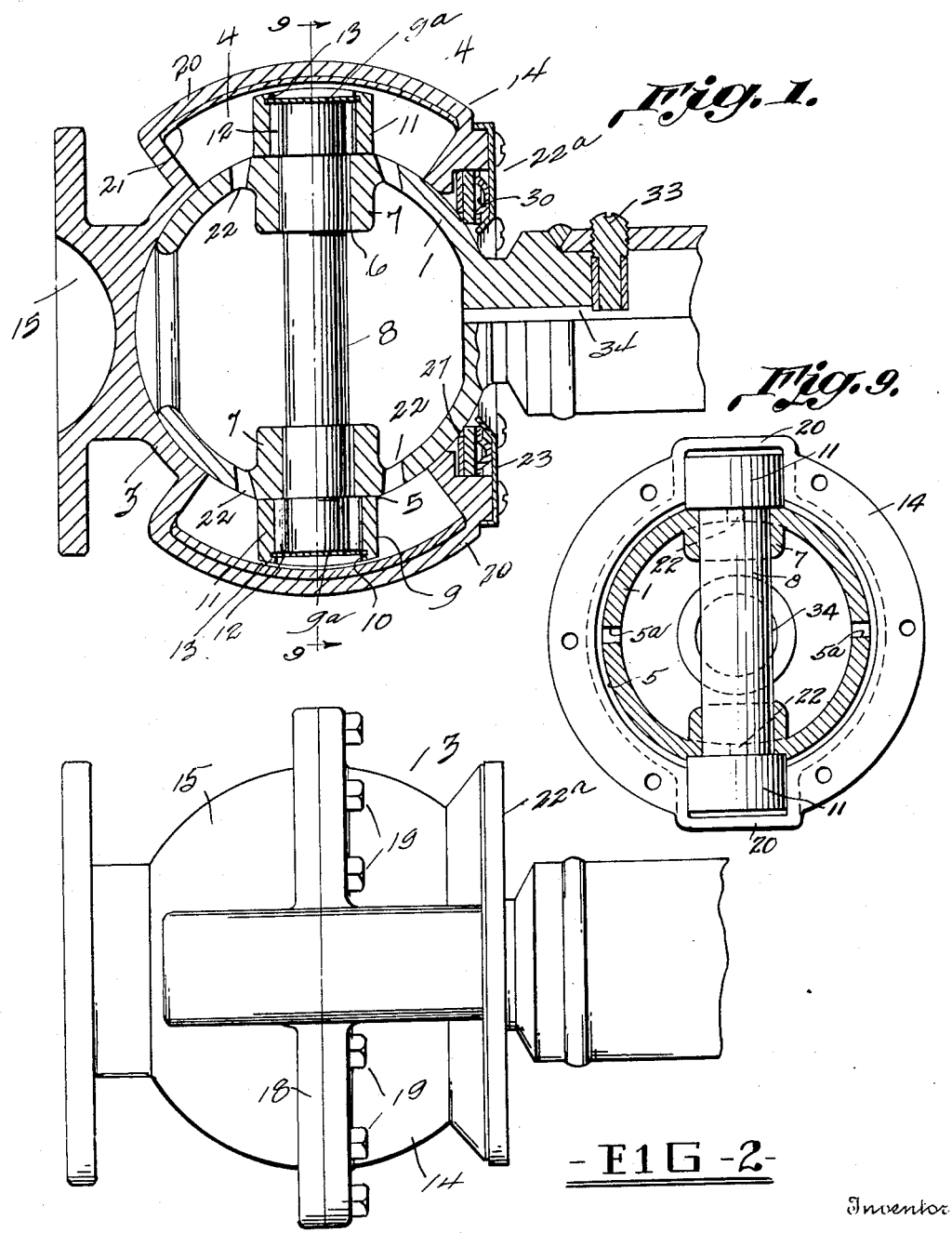
Inventor
VILLOR P. WILLIAMS, Dec. 26, 1933.     V. P. WILLIAMS     1,940,779
BALL AND SOCKET UNIVERSAL JOINT
Filed Sept. 22, 1932     3 Sheets-Sheet 2
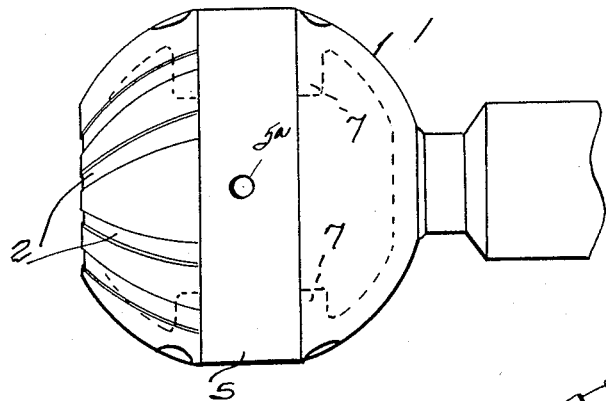
- FIG -3-
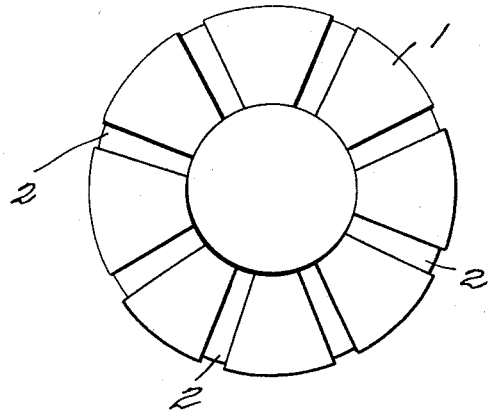
- FIG -4-
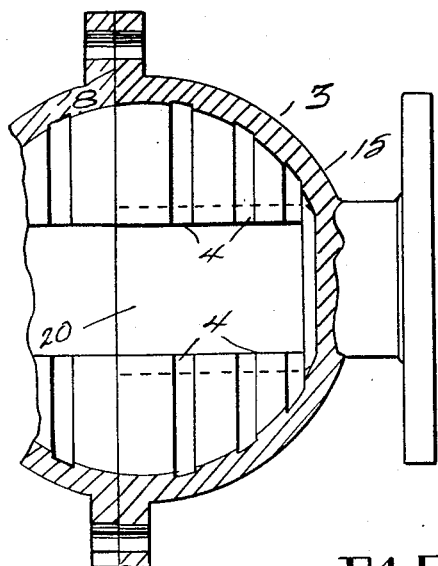
- FIG -5-
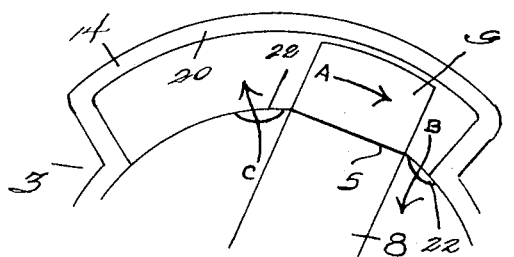
- FIG -1a-
Inventor
VILLOR P. WILLIAMS, Dec. 26, 1933.  V. P. WILLIAMS  1,940,779
BALL AND SOCKET UNIVERSAL JOINT
Filed Sept. 22, 1932   3 Sheets-Sheet 3
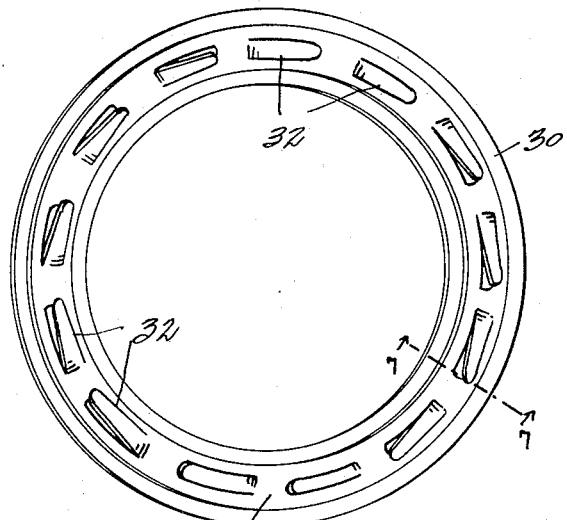
FIG-6-
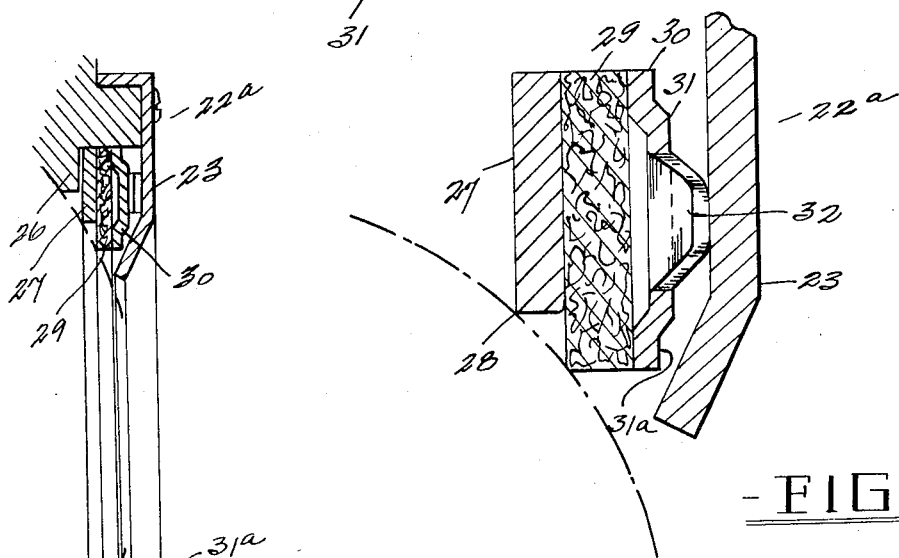
FIG-7-
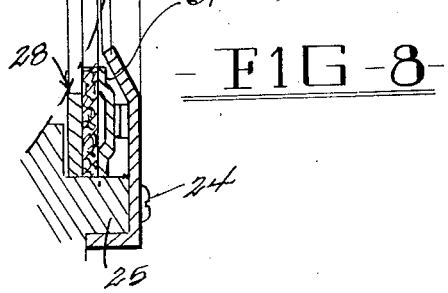
FIG-8-
Inventor
VLLLOR P WILLIAMS,
By
Attorney Patented Dec. 26, 1933

1,940,779

UNITED STATES PATENT OFFICE 1,940,779

BALL AND SOCKET UNIVERSAL JOINT

Villor P. Williams, Baltimore, Md., assignor, by mesne assignments, to Estelle P. Williams, Baltimore, Md.

Application September 22, 1932
Serial No. 634,393

13 Claims. (Cl. 64—91)

My present invention, in its broad aspect, has to do with improvements in ball and socket universal joints to the end that more efficient lubrication is attained, the parts of the joint rendered leak proof, and any lost motion or loose play between said parts prevented. More particularly it is my purpose; first, to provide an improved automatically adjustable packing member, which has means for exerting constant pressure and scraping action against the ball portion of the joint to the end that any looseness between the ball and socket portions is compensated for and leakage between said members prevented; second, to provide means whereby freezing or binding of the ball and socket members is prevented and the most effective lubrication obtained; third, to provide a reservoir and a means for inducing a circulation of oil between the meeting surfaces of the ball and socket members; and, fourth, to provide means for permitting proper circulation of lubricant to the ends of the trunnions in the housings, thereby to insure free and unhampered action of the trunnions.

In addition to the above important objects of my invention, my present universal joint is so formed that the respective parts thereof attain an unusually smooth and effective action even when the elements of the joint have an angularity of say from fifteen to twenty degrees, and furthermore since the interior of the male member functions as a reservoir for lubricant, and there are ports to either side of each trunnion end leading into the housings; the oscillating action of the trunnions in the housings serves to draw oil into the housings and expel it therefrom thus automatically renewing and attaining a constant maximum circulation of lubricant. The male element, as has been suggested heretofore, has a flattened band like area about its circumference, the purpose of which is to receive and cushion the action of surface lubricant between the male and female members, since there is perhaps .005 or .006 of an inch clearance between the male and female members which receives the surface lubricant and which would ordinarily have a tendency to expel the same when the elements of the joint are jammed together. My joint is especially desirable from the standpoint of providing end thrust, and the pins are antifrictionally mounted. However other and equally important objects of my invention will be apparent as the description proceeds, and in that connection it is emphasized that the scope of the invention should only be determined by reference to the appended claims.

In the drawings wherein is illustrated the preferred form of my invention;—

Figure 1 is a vertical section through my universal joint assembly;—

Figure 1a is a diagrammatic view of the manner in which lubricant circulates in and out of the housings;

Figure 2 is a top plan view of the same;

Figure 3 is a view of the male portion of my joint;

Figure 4 is an end view of the male portion of my joint;

Figure 5 is a sectional side elevation of the female part;

Figure 6 is a view of my combination spring and washer.

Figure 7 is an enlarged section, suggested by lines 7—7 of Figure 8 through the packing and take up member between the male and female parts of my joint.

Figure 8 is a section through the packing assembly, and

Fig. 9 is a section taken on the line 9—9 of Fig. 1.

In the drawings wherein like characters of reference are used to designate like or similar parts throughout the several views;—

The numeral (1) designates the male element of my joint which is a hollow semi-spherical ball, and may be of sheet metal; the forward surface of the male member is longitudinally channeled as at (2); the entire inner surface (both sections) of the female or socket member (3) is provided with transverse annular channels (4), so that said channels (2) and (4) cooperate to properly distribute lubricant between the meeting surfaces of the male and female members to prevent seizing and binding. The male element (1) is further provided with a flattened annular band or area (5) which forms in effect a chamber for trapping surface lubricant. Furthermore there are openings (5a) through the male member at the band (one of which is shown in Figure 3) to permit excess of lubrication to flow back into the interior of the male member. Referring again to the circular or annular transverse grooves or channels in the sections of the female member; these insure proper lubrication over the whole surface, and the longitudinal channels (2) in the male member assist this action and absolutely prevent seizing. The male element (1) has two axially opposed openings (6) therein which may be interiorly bossed as at (7), and extending axially therethrough and outwardly a distance from each side thereof is a pin (8) said pin being properly supported by the bosses (7). This pin (8) carries a needle roller bearing assembly (9) at its respective ends. While rotational movement of the pin is free axial movement is prevented by disposing a pair of cross pieces (9a)— one at each end—across the ends of the pin and engaging in an annular lip (10) in the bushing sleeve (11) as shown in Figure 1; the needle bearings per se (12) are prevented from slipping out of the sleeve by a small annular flange (13); the cross-piece (9a) is ordinarily sprung into place in the annular recess provided between the lip (10) and flange (13).

The female element (3) which receives the male element is in the form of a hollow semi-spherical shell, which also may be a sheet metal stamping; and is constructed of two parts, designated (14) and (15) both of which are interiorly channeled as at (4); these parts being flanged at (18) and bolted together at (19). The part (15) is attached by suitable means to the unit to be driven: furthermore the female element is formed with outstruck housings or journal bearings (20) on each side thereof to receive the ends of the pin (8); the journals or housings are elongated so that the pins may rock and turn therein to give the joint the required angularity. The housing is lined as at (21), and the antifrictional bearings work on the walls of the housings so that the greatest effectiveness is attained.

The interiors of the housings are lubricated through the openings (22) on each side of the respective ends of the pin (8); thus as the pin moves toward one end of the housing in the direction of arrow a in Figure 1a, oil is expelled in the direction of arrow b and drawn into the housing in the direction of arrow c, thereby automatically providing for circulation of lubricant and preventing possible interference with the oscillation of the ends of the pin in the housings due to entrapment of oil in one end of the housings. The pins in this capacity serve in the nature of pumps to draw oil into and expel oil from the housings.

It is here noted that my present invention is a continuation in part of my application for patent Serial #610,249, filed May 9th, 1932.

An especially important feature of my present invention is a novel oil seal and bearing member generally designated by numeral (22a) and shown in detail in Figures 6—7—8. The assembly of this element is carried by the female member, there being an annular cover plate (23) attached by screws (24) to an annular boss (25) on the forward end of the female element. The female element is cut away to form an annular seat (26) beneath the cover plate upon which is assembled in the order named; a thin hard metal annulus (27) which has a sharpened edge (28) bearing against the surface of the male element when in place; a composition packing member (29) which also bears against the surface of the male member, and a combination washer and spring member (30) which is shown in detail in Figure 6. The combination washer and spring member has a central raised portion (31) and flattened edges (31a) with a series of up-struck spring fingers (32) in the raised portion (31) which bear against the under side of the cover plate (23) when assembled so that the packing and edge (28) are forced tightly against the surface of the male member; the edge (28) serves to scrape oil therefrom, and the member (29) being wider than the member (27) engages the surface and serves to wipe the surface of the male member to remove gritty particles and provide a dust proof joint. These members are automatically held tightly against the surface of the male member by the fingers (32); and the member as a whole can be quickly set up and dismounted by simply removing the cover plate. A desirable method of filling the male member with lubricant is shown in Figure 1 where a filling plug (33) is provided with leads through a channel (34) into the interior of the male member.

In assembling my joint the section (14) is detached from the section (15) of the female member; and the male member (1) fitted into the section (15) and filled with lubricant, in which position the pins (8) engage in the housings. The section (14) is then applied and bolted up to complete the operative assembly. As shown, the pins are properly supported by the bosses (7); and excess lubrication on the meeting surfaces of the male and female members and circulation of such lubrication is cared for by the openings (5a). Furthermore since member (29) is larger in diameter than the scraper ring or metal annulus (27) all foreign particles are intercepted before they are engaged by the scraper ring. The flattened edges (31a) of the combination washer and spring member serve at all times to repress the packing, thereby eliminating the necessity of an extra washer, and the spring fingers insure and provide for extra "give" in the event the edge of the annulus or scraper ring becomes dull—in practice the tension on said fingers being equal to about 1/16th inch. The joint is self-lubricating, tight, and provides the greatest resistance to end thrust, and is strong light, durable and easily and cheaply manufactured.

While the preferred form of my universal joint has been described and shown in the foregoing, certain changes may be made in the detailed construction thereof without departing from the spirit of the invention, and accordingly it is again emphasized that interpretation of the scope of the invention should only be conclusive when made in the light of the subjoined claims.

I claim:—

1. In a universal joint of the ball and socket type, the ball or male member having an annular flattened part or band thereabout with openings leading to the interior of the ball to form a reservoir between the surface of the ball and the interior surface of the socket or female member said openings serving to provide means to induce circulation of lubrication from the interior of the ball to the reservoir formed by the band and vice versa.

2. In a universal joint of the ball and socket type, the ball or male member having an annular flattened part or band thereabout to form a cavity between the surface of the ball and the interior surface of the socket or female member thereby to trap lubricant, and the ball member being provided with openings in the part having the band and leading into the interior of the ball to receive lubricant therethrough.

3. In a universal joint, a hollow ball member providing a main reservoir for lubricant, a two part socket formed with diametrically opposed journal housings arranged in the plane of the longitudinal axis of the joint, a trunnion carried by said ball and projecting into said journal housings, said ball being provided with a circumferential flat portion on the outer surface thereof in the plane of said trunnion transverse to said longitudinal axis and defining with the inner surface of said socket an annular auxiliary reservoir, and opposed conduits in said ball communicating the main and auxiliary reservoirs whereby movements of said ball and socket will induce a circulation of lubricant to and from said reservoirs.

4. In a universal joint, a hollow ball member providing a main reservoir for lubricant, a two part socket formed with diametrically opposed journal housings arranged in the plane of the longitudinal axis of the joint, a trunnion carried by said ball and projecting into said journal housings, said ball being provided with a circumferential flat portion on the outer surface thereof in the plane of said trunnion transverse to said longitudinal axis and defining with the inner surface of said socket an annular auxiliary reservoir, and conduits in the ball on each side of the trunnion communicating the main reservoir with said journal housings, whereby movements of said trunnions in said journal housings will induce a constant circulation of lubricant between said main reservoir and said journal housings.

5. In a universal joint, a hollow ball member formed with a cylindrical shank communicating with the interior thereof, a two part socket formed with diametrically opposed journal housings arranged in the plane of the longitudinal axis of said joint, a trunnion carried by said ball and projecting into said journal housings for rotary and angular movement therein, said ball being provided with a circumferential flat portion on the outer surface thereof in the plane of said trunnion transverse to said longitudinal axis and defining with the inner surface of said socket an annular auxiliary reservoir, conduits in the ball on each side of the trunnion communicating the interior of said ball with the journal housings and additional conduits in the ball communicating the interior of the ball with the auxiliary reservoir whereby movement of the trunnion in the journal housings will induce a constant circulation of lubricant from the interior of the ball to said journal housings and said auxiliary reservoir.

6. In a universal joint comprising a ball member and a two part socket member, a main reservoir for lubricant within said ball member, an auxiliary annular reservoir between said ball and socket members, and opposed conduits communicating said main reservoir with said auxiliary reservoir.

7. In a universal joint comprising a ball member and a two part socket member, a main reservoir for lubricant within said ball member, an auxiliary annular reservoir between said ball and socket members, opposed conduits communicating said main reservoir with said auxiliary reservoir and resilient automatically adjustable packing means carried by said socket member for lubricant sealing engagement with said ball member.

8. In a universal joint comprising a ball member and a two part socket member, trunnions carried by said ball member, parallel opposed bearing housings on said socket member arranged in the plane of the longitudinal axis of said joint and adapted to receive the trunnions therein, a main reservoir for lubricant within said ball member, an auxiliary annular reservoir between said ball and socket members, and packing means carried by said socket member for lubricant sealing engagement with said ball member.

9. In a universal joint comprising a ball member and a two part socket member, trunnions carried by said ball member, parallel opposed bearing housings on said socket member arranged in the plane of the longitudinal axis of said joint and adapted to receive the trunnions therein, a main reservoir for lubricant within said ball member, an auxiliary annular reservoir between said ball and socket members, conduit means in said ball member communicating said main reservoir with said bearing housings, and resilient automatically adjustable packing means carried by said socket member for lubricant sealing engagement with said ball member.

10. In a universal joint comprising a ball member and a two part socket member, trunnions carried by said ball member, parallel opposed bearing housings on said socket member arranged in the plane of the longitudinal axis of said joint and adapted to receive the trunnions therein, said trunnions dividing each of said bearing housings into two chambers, a main reservoir for lubricant within said ball member, an auxiliary annular reservoir between said ball and socket members, a plurality of conduit means in said ball member, each communicating the main reservoir with a chamber of said bearing housings, and packing means carried by said socket member for lubricant sealing engagement with said ball member.

11. In a universal joint comprising a ball member and a two part socket member, trunnions carried by said ball member, parallel opposed bearing housings on said socket member arranged in the plane of the longitudinal axis of said joint and adapted to receive the trunnions therein, a main reservoir for lubricant within said ball member, conduit means in said ball member communicating said reservoir with said housings, and packing means carried by said socket member for lubricant sealing engagement with said ball member.

12. In a universal joint comprising a ball member and a two part socket member, trunnions carried by said ball member, parallel opposed bearing housings on said socket member arranged in the plane of the longitudinal axis of said joint and adapted to receive the trunnions therein, a main reservoir for lubricant within said ball member, conduit means in said ball member on each side of the plane of said trunnions communicating said reservoir with said housings and resilient automatically adjustable packing means carried by said socket member for lubricant sealing engagement with said ball member.

13. In a universal joint comprising a ball member and a two part socket member, trunnions carried by said ball member, parallel opposed bearing housings on said socket member arranged in the plane of the longitudinal axis of said joint and adapted to receive the trunnions therein, said trunnions dividing each of said bearing housings into two chambers, a main reservoir for lubricant within said ball member, a plurality of conduit means in said ball member, each communicating the main reservoir with a chamber of said bearing housings and packing means carried by said socket member for lubricant sealing engagement with said ball member.

VILLOR P. WILLIAMS.